(12) United States Patent
Meier et al.

(10) Patent No.: US 8,756,798 B2
(45) Date of Patent: Jun. 24, 2014

(54) DEVICE FOR FITTING AND EQUIPPING MOTOR VEHICLE BATTERY HOUSING

(75) Inventors: Jochen Meier, Hartenstein (DE); Thomas Dörffel, Zwickau (DE); Roger Loer, Hannover (DE)

(73) Assignees: Sasit Industrietechnik GmbH, Zwickau (DE); VB Autobatterie GmbH & Co. KGAA, Hannover (DE)

( * ) Notice: Subject to any disclaimer, the term of this patent is extended or adjusted under 35 U.S.C. 154(b) by 312 days.

(21) Appl. No.: 13/390,743

(22) PCT Filed: Aug. 20, 2010

(86) PCT No.: PCT/DE2010/000979
§ 371 (c)(1),
(2), (4) Date: Jun. 1, 2012

(87) PCT Pub. No.: WO2011/020469
PCT Pub. Date: Feb. 24, 2011

(65) Prior Publication Data
US 2012/0240394 A1    Sep. 27, 2012

(30) Foreign Application Priority Data

Aug. 20, 2009   (DE) .................... 20 2009 011 262 U (51) Int. Cl.
| | |
|---|---|
| *H01M 10/14* | (2006.01) |
| *B23P 19/00* | (2006.01) |
| *B23P 21/00* | (2006.01) |
| *H01M 4/82* | (2006.01) |

(52) U.S. Cl.
USPC ............ 29/730; 29/787; 29/564.1; 29/623.1; 29/33 K; 29/2; 228/58; 228/901; 228/6.1; 53/367; 414/754; 414/757; 414/781; 414/783; 429/211; 429/241

(58) Field of Classification Search
CPC ..... Y02E 60/12; Y02E 60/126; H01M 10/14; H01M 10/0404; B29C 65/20
USPC ....... 29/730, 731, 564.1, 623.1, 787, 33 K, 2; 228/58, 901, 6.1; 53/367; 414/754, 414/757, 781, 783; 429/211, 241
See application file for complete search history.

(56) References Cited

U.S. PATENT DOCUMENTS

| | | | | |
|---|---|---|---|---|
| 3,604,094 | A | * | 9/1971 | Farmer ............................. 29/714 |
| 3,813,024 | A | * | 5/1974 | Kirchberger .................... 228/58 |
| 4,502,213 | A |   | 3/1985 | Madden et al. |
| 4,982,482 | A | * | 1/1991 | Wheadon et al. ................... 29/2 |
| 5,775,871 | A |   | 7/1998 | Redden |

(Continued)

FOREIGN PATENT DOCUMENTS

| | | |
|---|---|---|
| EP | 1637237 A2 | 3/2006 |
| GB | 2056160 A | 3/1981 |

*Primary Examiner* — David Bryant
*Assistant Examiner* — Jun Yoo
(74) *Attorney, Agent, or Firm* — Laurence A. Greenberg; Werner H. Stemer; Ralph E. Locher (57) ABSTRACT

The invention relates to a device for fitting and equipping motor vehicle battery housings as a compact system, which comprises individual production stations and associated transport devices, wherein the battery plate packs to be processed are arranged in clamping cassettes and are provided to the device in the necessary pack width for the intended battery cells by a feeding station arranged upstream.

12 Claims, 9 Drawing Sheets

(56) References Cited

U.S. PATENT DOCUMENTS 5,918,725 A 7/1999 Farina
6,095,316 A 8/2000 Redden
8,356,412 B2 * 1/2013 Kraenzle ................ 29/896.1

* cited by examiner

DEVICE FOR FITTING AND EQUIPPING MOTOR VEHICLE BATTERY HOUSING

BACKGROUND OF THE INVENTION

Field of the Invention

The invention relates to a device for fitting and equipping motor vehicle battery housings as a compact system, which is composed of individual fabrication stations and associated transport devices, wherein the battery plate packs which are to be processed are arranged in clamping cartridges and are made available to the device, with the necessary pack width for the battery cells which are provided, by a feed station which is connected upstream.

To fabricate motor vehicle batteries it is necessary to arrange a multiplicity of electrode plates in individual battery cells which are arranged separately from one another in the battery housing. In this context, the electrode plates are combined to form individual packs and are assigned to the battery cells. A device for connecting individual battery plates to form packs and for inserting these packs into battery boxes is described in AT 008 261 U1. The individual necessary processing steps are carried out in a total of 14 processing stations which are arranged one after the other. This requires an immense amount of space for setting up such a system and extensive transportation during fabrication.

BRIEF SUMMARY OF THE INVENTION

The object of the invention is to provide a fitting device both for battery housings which are equipped with a single row of battery cells and battery housings which are equipped with a double row of battery cells, which fitting device is of compact design, is distinguished by requiring a small amount of space and combines all the necessary working steps for fitting and equipping the battery housings in order to rule out intermediate transportation of the incompletely equipped and/or processed battery plate packs during fabrication.

According to the invention, the object is achieved by means of the features of claim 1. The advantageous refinements are described in the dependent claims.

Accordingly, the device according to the invention for equipping and processing motor vehicle battery housings is distinguished by the fact that a total of four processing stations which to a certain extent carry out multiple working steps are arranged around an electrically driven lifting/rotary table, wherein the four processing stations are each arranged offset through 90° around the centrally arranged lifting/rotary table.

At least one feed belt which serves to feed clamping cartridges fitted with battery plates whose pack thickness has been previously tested, one or more lug aligners which can be lowered from above, one or more lug benders which can be lowered from above, and a pivoting mechanism which serves to pivot the clamping cartridges through 180° and can be actuated after the lowering of the lifting/rotary table are arranged at the first processing station. At least one buffer station is assigned to the feed station which is connected upstream of the first processing station, in order to ensure continuous feeding of clamping cartridges which are fitted with battery plates.

One or more fluxing devices which serve to wet the lugs of the battery plates with fluxing agent and can be fed to the clamping cartridges from below are arranged at the second processing station. Furthermore, at least one tin bath which serves to tin-plate the lugs of the battery plates, is heated, can be raised from below in an upward direction and lowered and has a stripper which serves to remove the oxidate, one or more drying devices which serve to dry the tin-plated lugs and are mounted in a tiltable fashion, and a pivoting mechanism which serves to pivot the clamping cartridges through 180° and can be actuated after the lowering of the lifting/rotary table are arranged at this processing station.

At least one casting bridge discharge device with a separate pneumatic lifting device, a heatable lead mold which is arranged under the clamping cartridge and has integrated lead bath chambers, and a setting down/lifting device which serves to dip the clamping cartridge, rotated downward with the lugs, into the lead bath are arranged at the third processing station.

At least one pivoting mechanism which can be actuated when the lifting/rotary table is lowered, and one or more gripper gantries which are equipped with at least six grippers, can be lowered to the clamping cartridges and serve to remove the battery plate packs, as well as at least one boxing-in frame, and one or more conveyor belts which serve to transport and to rotate the battery housing, which is made available, and are equipped with a rotary device are arranged at the fourth processing station.

In a larger system, the conveyor belts equipped with a rotary device can be arranged in a multiple fashion, with the result that the multiply arranged grippers can at the same time box in repeatedly.

Since the boxing-in frames have to be cleaned repeatedly, the system has a changing station at the fourth processing station. In this context, the boxing-in frames are arranged in duplicate one next to the other, wherein one is available to be equipped and a further one can be moved out laterally and cleaned while the other is being equipped. This is done alternately.

The individual processing stations are arranged in succession and at the same time are each arranged offset through 90° around the central lifting/rotary table.

In a cyclical fashion, raising, rotation and lowering is carried out simultaneously at all the processing stations. The pivoting of the clamping cartridges and the individual processing steps at the individual stations are matched chronologically to this rhythm. For this purpose, the lifting/rotary table is embodied as a rotary indexing table with a pneumatically moved lifting unit.

Only the clamping cartridge which is located in the cartridge carrier is transported on from one processing station to the other.

For this purpose, at least four cartridge carriers are arranged, each offset through 90°, at the lifting/rotary table.

In the processing stations 1, 2 and 4 it is advantageous for the multiple processing of the battery plates that in each case a toothed rack drive which serves to rotate the clamping cartridges through 180° and is operated pneumatically is arranged at the pivoting mechanisms provided there. For compliance with the cyclical operating times in a processing station which is configured in a multiple fashion, it is advantageous that in addition a transfer device which serves for simultaneously positioning at least two empty or filled battery housings at the boxing-in station is assigned to the processing station 4. At least two battery housings are picked up by means of additional grippers, transported on and set down at the desired location, thereby positioning at least two battery housings simultaneously.

In order to ensure subsequent quality testing and documentation, in addition a monitoring station which is equipped with a balance for determining and monitoring the battery weight and with a code reader which serves to assign the determined weight to the corresponding battery is assigned to the processing station 4.

Completely fitted battery housings which do not have the corresponding weight are eliminated at this point.

In order to be able to effectively configure the cyclical operating time frequency of the system, it is also advantageous that a multiple gripper which serves to fit the clamping cartridge is arranged between the first processing station and the feed station, connected upstream, for the battery plate packs whose pack thickness is tested. Should the clamping cartridge still be equipped in the processing station 1, then the pack is put down at a buffer station, for example embodied as a buffer belt, of the feed device, from which it can be removed by means of the multiple gripper at any time when necessary and fed to the processing station 1. The multiple gripper can advantageously be embodied as a six-unit gripper or as a twelve-unit gripper.

For the fluxing device which is arranged in the second processing station it is advantageous to arrange a separate drive for the roller and the fluxing agent basin which can each be moved horizontally under the clamping cartridge.

An electrically operated servo bevel wheel geared motor which is connected to a toothed rack and is coupled in terms of control to the lifting/rotary table is provided as a separate drive for this.

The drying device which is arranged in the processing station 2 is advantageously embodied as a warm air dryer.

The invention will be explained in more detail below using an exemplary embodiment.

DESCRIPTION OF THE INVENTION

Exemplary Embodiment:

According to FIGS. 1 to 6, a device for fitting and equipping motor vehicle battery housings is composed of individual fabrication stations and associated transport devices, wherein the battery plate packs which are to be processed are arranged in clamping cartridges 6 and are made available to the system for further processing and for arrangement in the battery housings with the necessary pack width.

Figure 1:
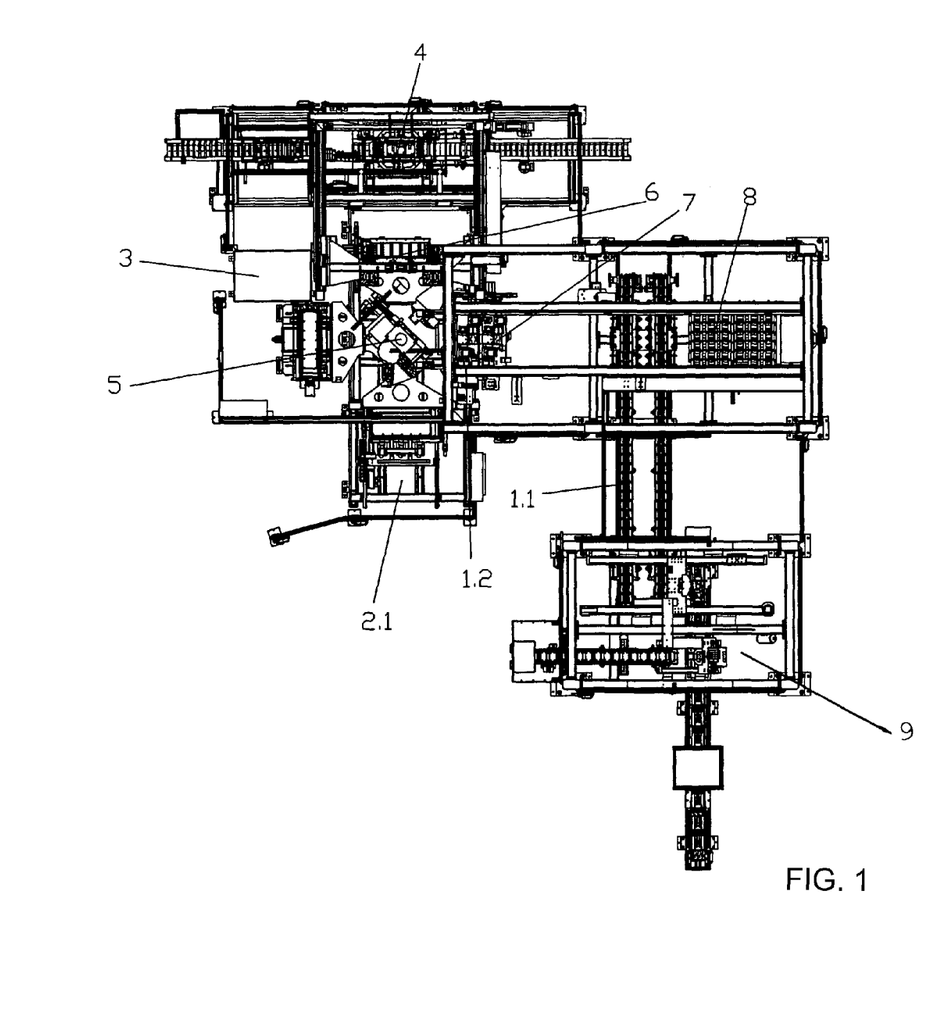
FIG. 1 shows a schematic plan view of the device for fitting and equipping motor vehicle battery housings with the processing stations 1 to 4 and the centrally arranged lifting/rotary table, as well as the feed station for the battery plate packs whose pack thickness is tested.
Figure 2:
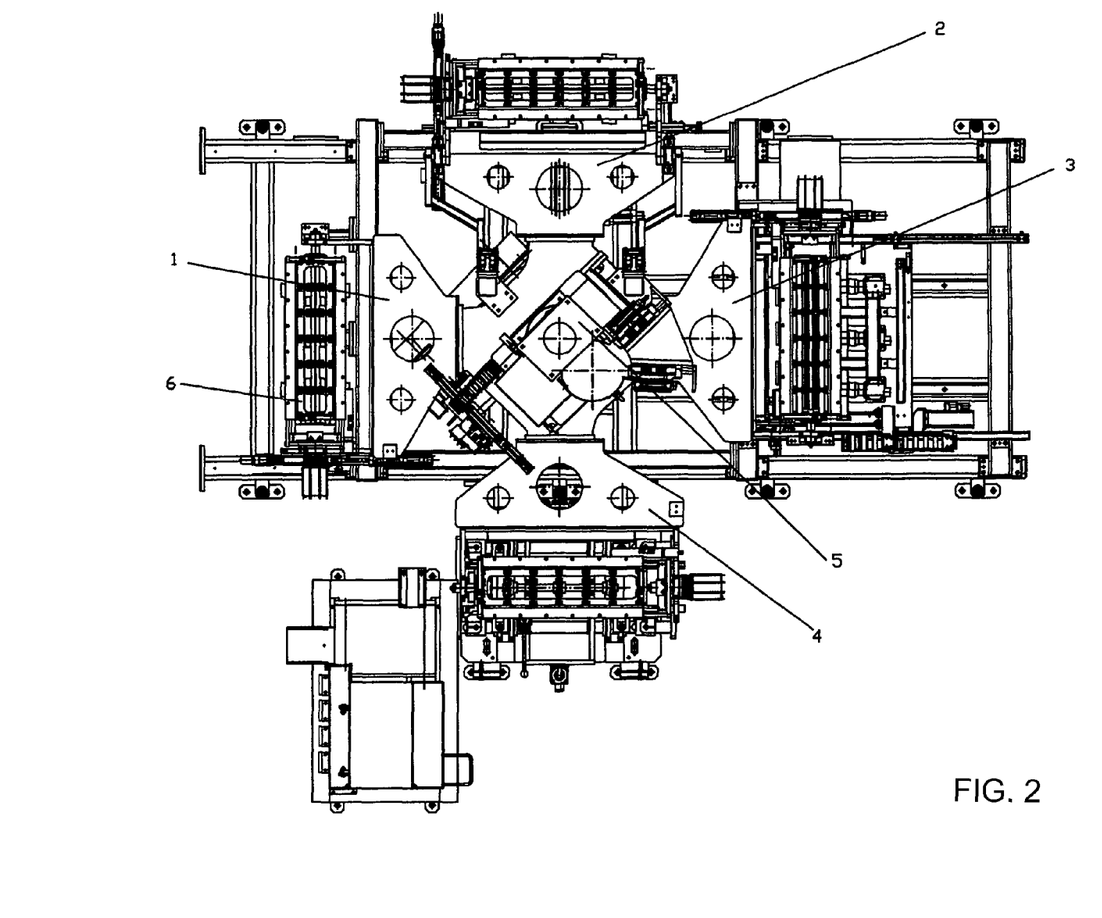
FIG. 2 shows a schematic plan view of the device for fitting and equipping motor vehicle battery housings with the processing stations 1 to 4 and the centrally arranged lifting/rotary table.
Figure 3:
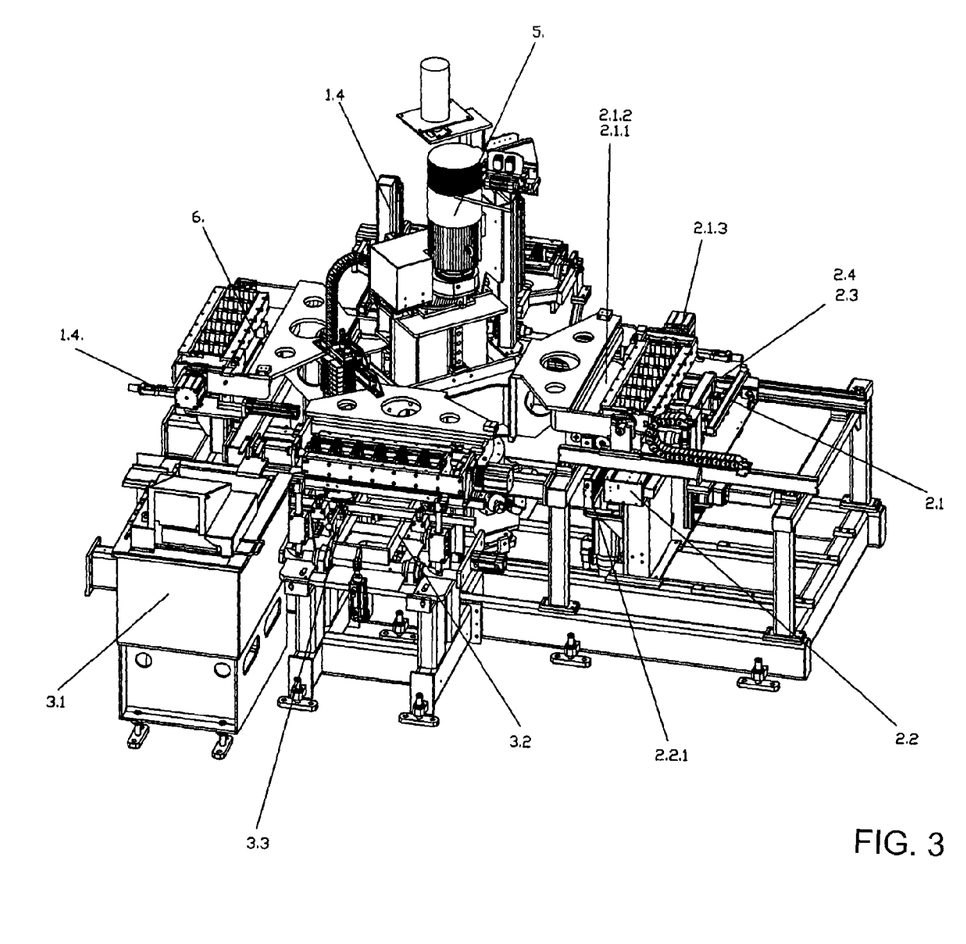
FIG. 3 shows a schematic, three-dimensional parallel view of the device for fitting and equipping motor vehicle battery housings with the processing stations 1 to 4 and the centrally arranged lifting/rotary table.

Connected upstream of the compact system is a feed station 9 equipped with a six-unit gripper 7 which assigns the battery plate packs, which have been fed to the feed belt 9 and which have already been tested with respect to their necessary pack thickness, to the empty clamping cartridges 6 of the processing station 1 or, if there is no need for them there, to the buffer belt 8 which is arranged at the feed station 9. For this purpose, the feed station 9 has a separate drive. At its core the compact system has a centrally arranged electrically actuated lifting/rotary table 5, around which a total of four processing stations 1-4 are each arranged offset through 90°.

Figure 4:
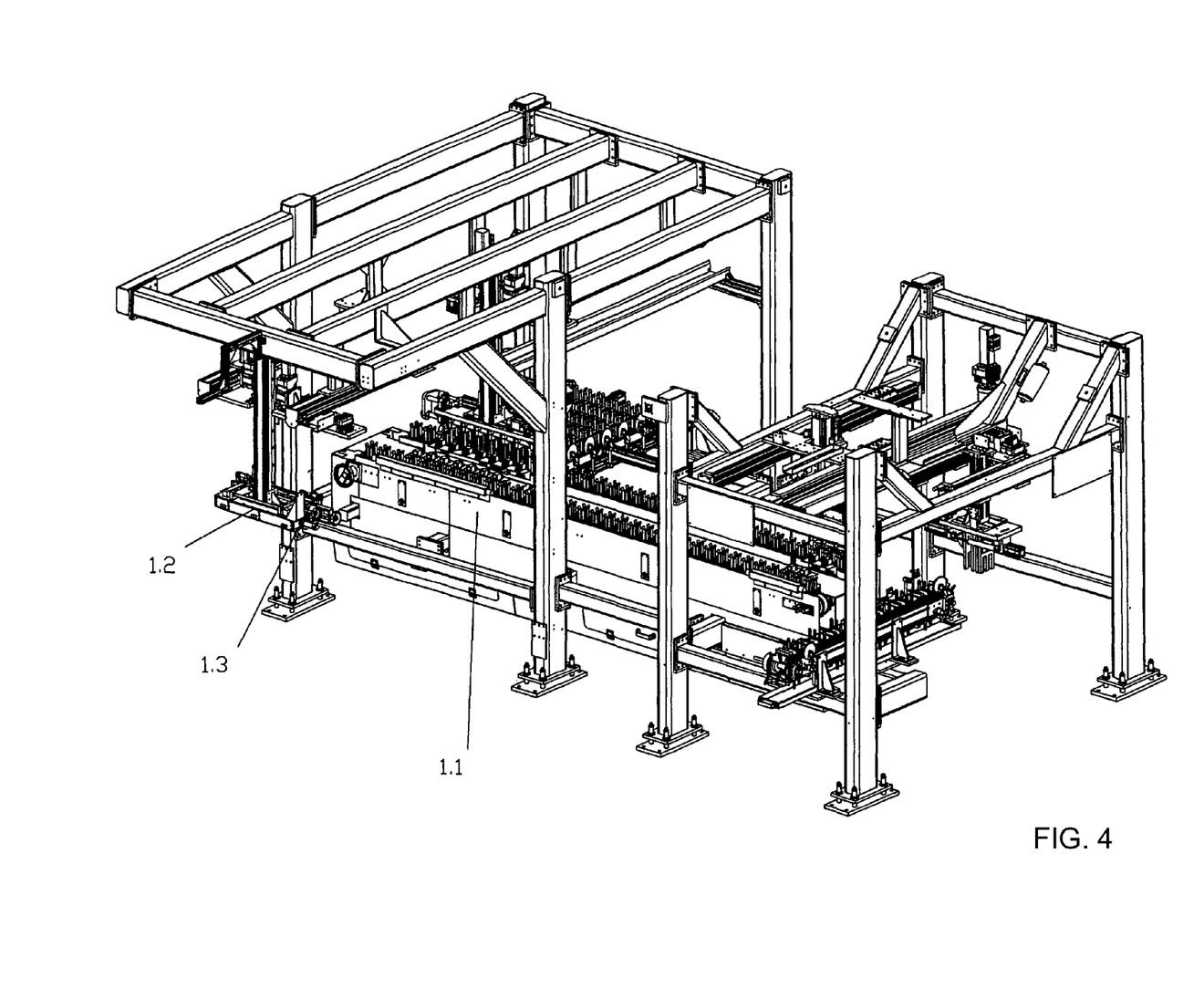
FIG. 4 shows a separate schematic view of the processing station 1 with the feed belt, lug aligner and lug bender.

The clamping cartridge which is fitted in the processing station 1 and arranged in the cartridge carrier there has a lug aligner 1.2 arranged above it, which lug aligner 1.2 is lowered downward from above for the purpose of aligning the battery plate lugs, and is lifted up again after the alignment process and positioned in its home position.

The clamping cartridge which is fitted in the processing station 1 and arranged in the cartridge carrier there has a lug bender 1.3 arranged above it, which lug bender 1.3 is lowered downward from above for the purpose of bending the battery plate lugs and is lifted up slightly inward again after the bending of the respective outer lugs and positioned in its home position.

Figure 5:
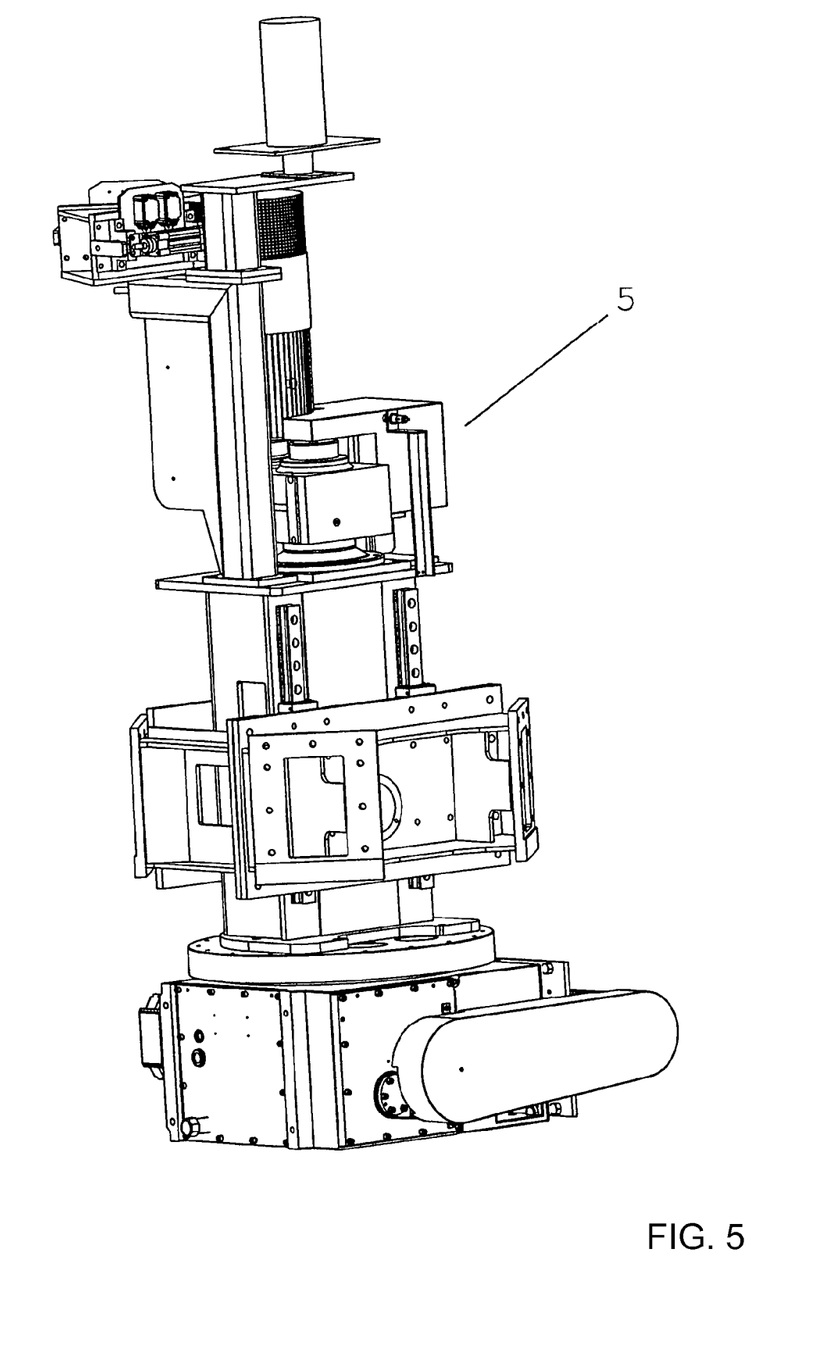
FIG. 5 shows a schematic, three-dimensional view of a lifting/rotary table without a cartridge carrier for the clamping cartridge.
Figure 6:
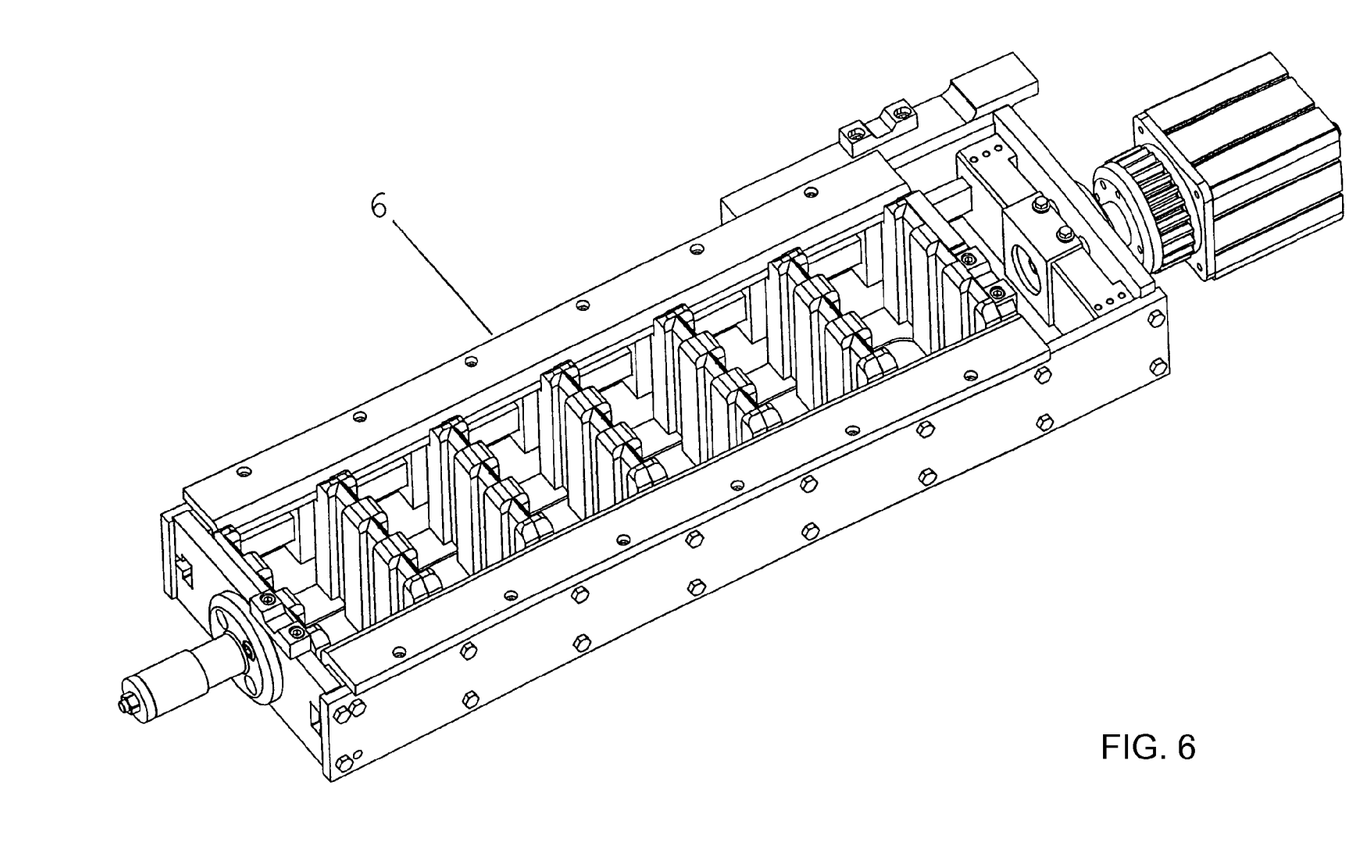
FIG. 6 shows a schematic illustration of a clamping cartridge.

The clamping cartridge 6 is transported on in the cartridge carrier to the processing station 2 by means of the lifting/rotary movement of the lifting/rotary table 5, and is transferred to said processing station 2.

The clamping cartridge 6 is rotated through 180° by means of the pivoting mechanism 2.4. The lugs of the battery plates are wetted with fluxing agent by means of the fluxing device 2.1 which can be fed from below.

For this purpose, the fluxing device 2.1 has a rotatable roller 2.1.1 which is moved past the lugs and in the process makes contact with the lugs and wets them. The roller 2.1.1 is wetted here in a fluxing agent basin which is located underneath the roller 2.1.1 and with which the roller 2.1.1 is in medium contact. The fluxing agent basin 2.1.2 and the roller 2.1.1 are moved horizontally away from the clamping cartridge 6 by means of the servo bevel wheel geared motor and toothed rack drive. At the same time, the heated tin bath 2.2, which is arranged underneath the positioned clamping cartridge 6 in the processing station 2, is moved upward until the lugs of the battery plates can dip in and therefore be tin-plated. The tin bath 2.2 is lowered again. For this purpose, the tin bath 2.2 and the fluxing agent basin 2.1.2 have a separate drive 2.1.3. The lugs are dried by means of a tiltably mounted warm air drying device 2.3.

When the tin bath 2.2 is lowered, a stripper 2.2.1 reaches over the tin bath 2.2 and in doing so strips off the tin residues of the tin bath 2.2 which are deposited. The clamping cartridge 6 remains in this position and is transported to the processing station 3 by means of the movements of the lifting/rotary table 5 and positioned there.

In the processing station 3, the electric bridges are integrally cast onto the battery plates of the individual plate packs.

For this purpose, the clamping cartridge 6 is lifted out by means of a separate pneumatic lifting device. In parallel to this, the casting bridges in the casting bridge discharge device 3.3 are discharged by means of a second pneumatic lifting movement.

The heatable lead mold 3.1 is positioned under the clamping cartridge 6 by means of the separate setting down/lifting device 3.2 for the lead mold, and the clamping cartridge 6 is dipped into the lead mold 3.1 with the lugs directed downward. The casting-on mold is heated in the process and the controller regulates the cooling circuit.

After the lowering of the lead mold 3.1 by the setting down/lifting device 3.2, the clamping cartridge 6 is transported onward by means of the movements of the lifting/rotary table 5 to the processing station 4.

Figure 7:
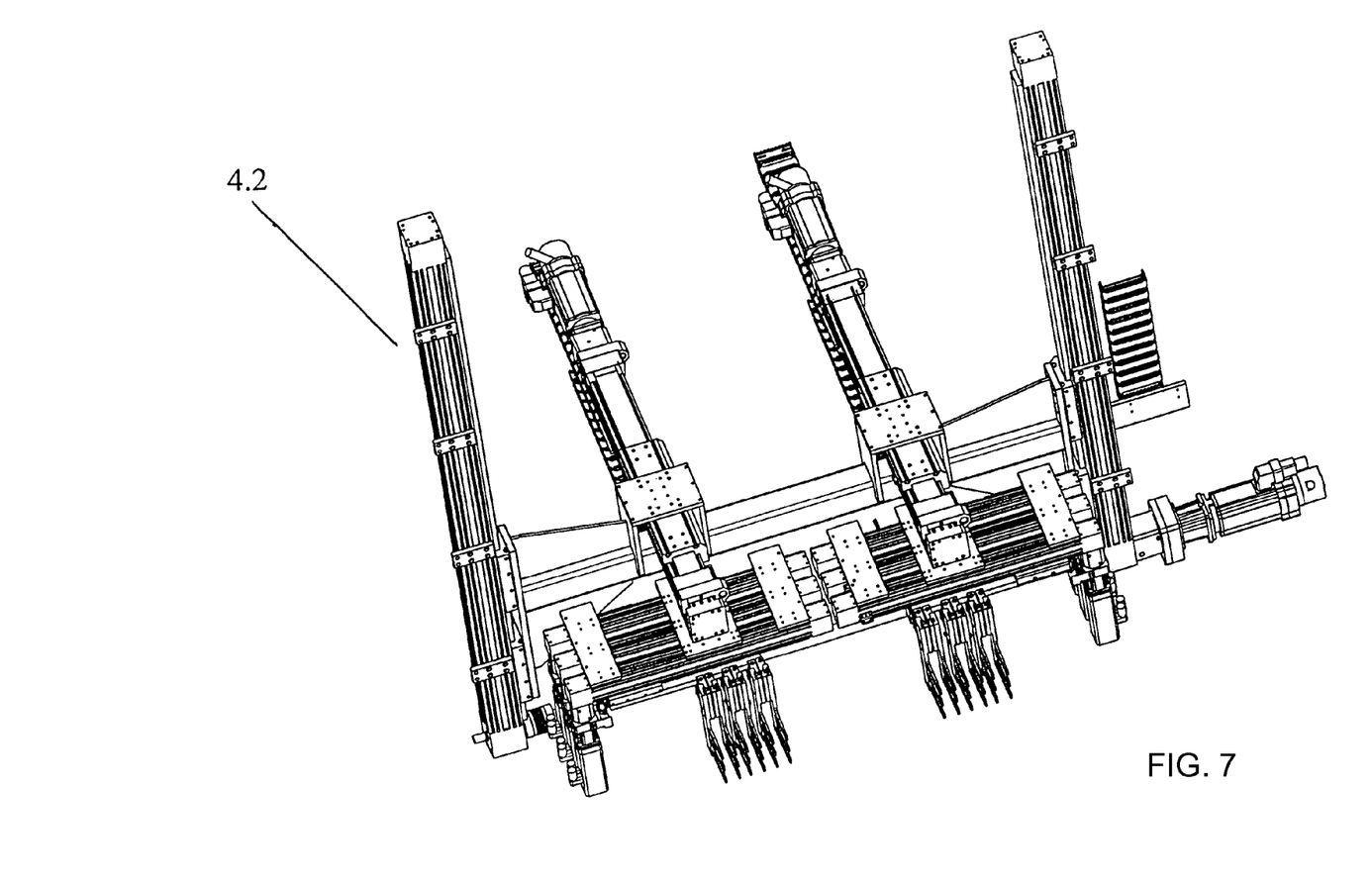
FIG. 7 shows a schematic view of the gripper gantry of the processing station 4.
Figure 8:
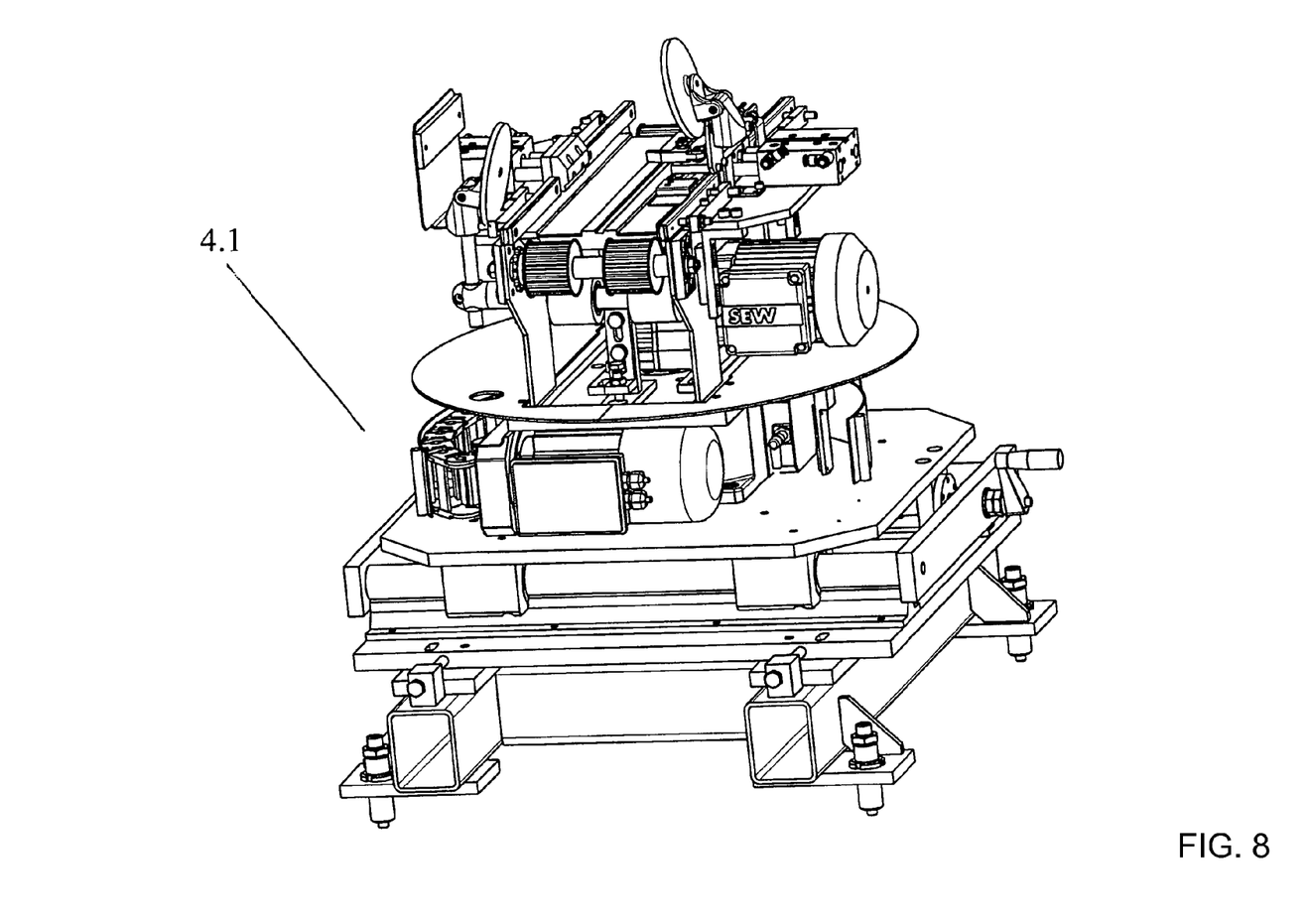
FIG. 8 shows a schematic, three-dimensional view of a pivoting mechanism for the clamping cartridge.

The processing station 4 is the removal station of the lifting/rotary table 5. The completely equipped battery plate packs are conveyed into the empty battery boxes and pressed in by means of the gripper gantry 4.2 of the boxing-in station. For this purpose, the gripper gantry 4.2 which is equipped with a total of six grippers is lowered over the clamping cartridge 6.

Three battery plate packs are always removed by three grippers in each case and conveyed to the boxing-in station with the empty battery housings which are made available on the conveyor belt. There, they are pressed into the provided battery cells by means of a spreading device for the battery housings and by means of an additional pressure die.

The three empty grippers move back and the three grippers which are still equipped move over the boxing-in station with the next three battery plate packs. At the same time, the half-equipped battery housing is rotated through 180° with the conveyor belt by means of the rotary device arranged there and is positioned for the take-up of the next three plate packs. The completely equipped battery housing 7 is conveyed out of the boxing-in station via the conveyor belt and is therefore conveyed out of the compact system and onto a buffer section.

For the necessary cleaning of the boxing-in frames, the latter are arranged at least in duplicate one next to the other in a changing device, with the result that one is available for the equipping process and a further one can be moved out laterally and cleaned while the other is being equipped. This is done in a continuous alternating fashion.

In order to ensure subsequent quality testing and documentation, in addition a monitoring station which is equipped with a balance for determining and monitoring the battery weight and with a code reader which serves to assign the determined weight to the corresponding battery is assigned to the processing station 4. Battery housings which are not fitted according to the specifications can therefore be eliminated.

With a device according to the invention of this type, a compact system for fitting and equipping motor vehicle battery housings is provided which makes it possible to continuously equip and completely process both single-row and double-row battery housings in a processing system. The device is distinguished by the star-shaped arrangement of the individual processing stations around a centrally arranged lifting/rotary table and by its extremely small requirement for space. The need for intermediate transportation of the unfinished plate packs outside the compact system is eliminated. Owing to the cyclically operating onward transportation of the battery plate packs, once positioned in a clamping cartridge, to the individual processing stations within the compact system, a continuous fabrication sequence is ensured.

Figure 9:
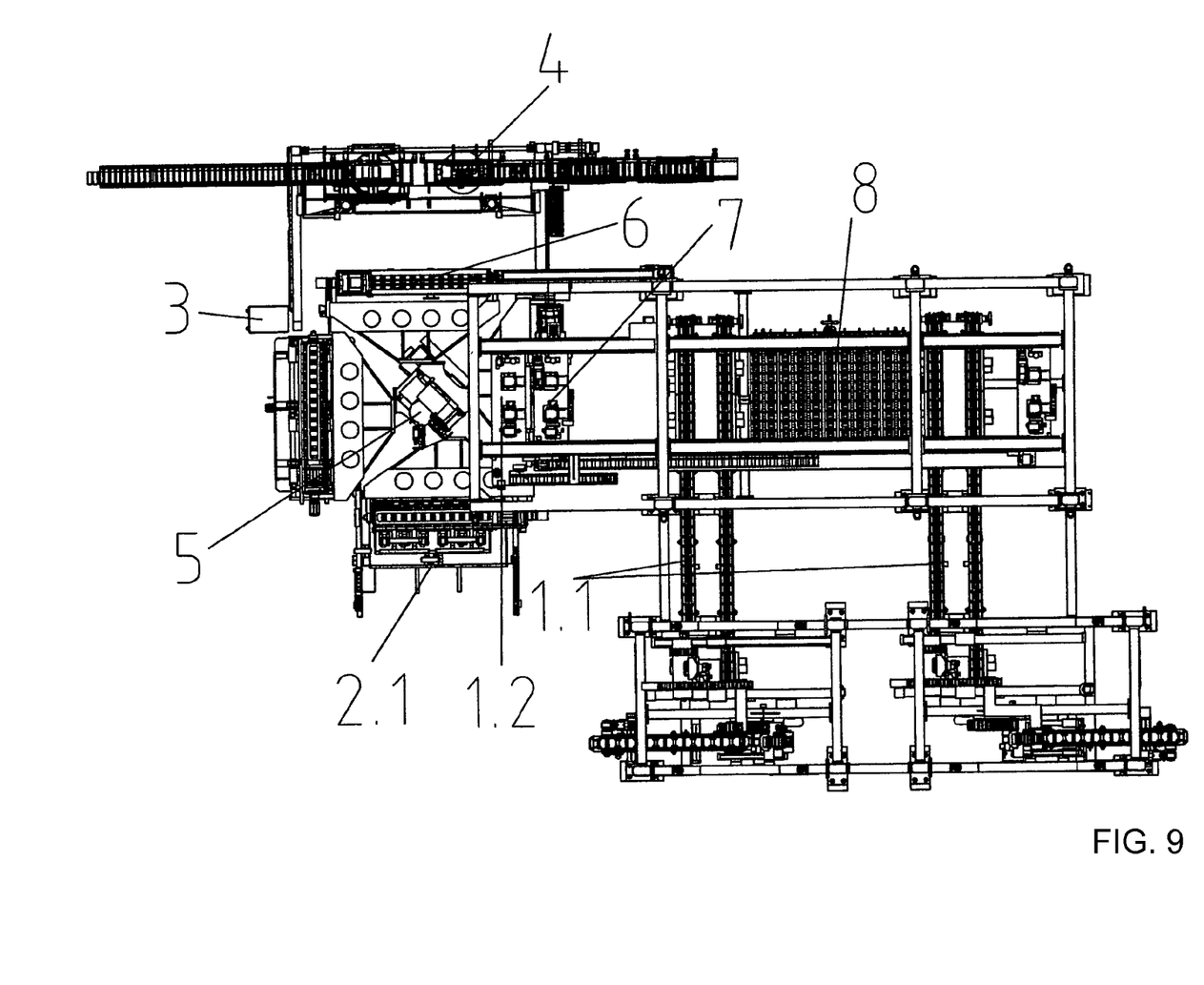
FIG. 9 shows a schematic plan view of a device, which is configured in a duplicate fashion, for fitting and equipping motor vehicle battery housings with the processing stations 1 to 4 and the centrally arranged lifting/rotary table, as well as the feed belts for the battery plate packs whose pack thickness is tested.

Exemplary Embodiment 2:

In order to increase the efficiency of such a system, it is possible according to FIG. 9 to equip the processing stations 1-4 which are arranged around a rotary/lifting table 5 with a plurality of separate or dimensionally larger individual processing devices so that multiple parts which are to be processed can be processed simultaneously during each cycle at each processing station.

For this purpose, both the feed devices and the transportation and discharge devices are embodied in a correspondingly dimensioned fashion or arranged in a multiple fashion, wherein the individual processing stations are embodied and arranged according to exemplary embodiment 1.

However, for compliance with the cyclical operating times in a processing station which is configured in a multiple fashion, it is advantageous that in addition a transfer device which serves for simultaneously positioning at least two empty or filled battery housings at the boxing-in station is assigned to the processing station 4. At least two battery housings are picked up simultaneously by means of additional grippers, transported on and set down at the desired location.

In order to ensure subsequent quality testing and documentation, in addition a monitoring station which is equipped with a balance for determining and monitoring the battery weight and with a code reader which serves to assign the determined weight to the corresponding battery is assigned to the processing station 4. Battery housings which are not equipped according to the specifications can therefore be eliminated.

With a device according to the invention of this type, a compact system for fitting and equipping motor vehicle battery housings is configured in such a way that, in addition to the advantages of the system which is embodied in exemplary embodiment 1, production can be carried out with at least twice the efficiency with approximately the same cyclical operating frequency.

LIST OF REFERENCE NUMBERS

1 Processing station 1
1.1 Feed belt
1.2 Lowerable lug aligner
1.3 Lowerable lug bender
1.4 Pivoting mechanism
2 Processing station 2
2.1 Fluxing device
2.1.1 Roller
2.1.2 Fluxing agent basin
2.1.3 Separate drive for roller and fluxing agent basin
2.2 Liftable tin bath
2.2.1 Stripper
2.3 Drying device
2.4 Pivoting mechanism
3 Processing station 3
3.1 Heatable lead mold
3.2 Setting down/lifting device for lead mold
3.3 Casting bridge discharge device
4 Processing station 4
4.1 Pivoting mechanism
4.2 Gripper gantry
5 Lifting/rotary table
6 Clamping cartridges
7 Multiple gripper
8 Buffer station
9 Feed station

The invention claimed is:

1. A device for fitting and equipping motor vehicle battery housings as a compact system, composed of individual fabrication stations and associated transport devices, wherein battery plate packs which are to be processed are arranged in clamping cartridges and are made available to the device with a necessary pack width, comprising:

- a total of four processing stations are arranged about an electrically driven lifting/rotary table,
- the four processing stations are each arranged offset through 90° around the lifting/rotary table,
- at least one feed belt which serves to feed clamping cartridges fitted with tested battery plates,
- one or more lug aligners which can be lowered from above,
- one or more lug benders which can be lowered from above, and
- a pivoting mechanism which serves to pivot the clamping cartridges through 180° and can be actuated after lowering of the lifting/rotary table are arranged at processing station 1,

- one or more fluxing devices which serve to wet the lugs of the battery plates with fluxing agent and can be fed to the clamping cartridges from below,
- one or more tin baths which serve to tin-plate the lugs of the battery plates, are heated, can be raised from below in an upward direction and lowered and have one or more strippers which serve to remove oxidate,
- a drying device which serves to dry the tin-plated lugs and is mounted in a tiltable fashion, and
- a pivoting mechanism which serves to pivot the clamping cartridges through 180° and can be actuated after lowering of the lifting/rotary table are arranged at processing station 2,

- at least one casting bridge discharge device with a separate pneumatic lifting device,
- one or more heatable lead molds which are arranged under the clamping cartridge, and
- at least one setting down/lifting device which serves to dip the clamping cartridge, rotated downward with the lugs, into the lead mold are arranged at processing station 3,

- at least one pivoting mechanism which can be actuated when the lifting/rotary table is lowered,
- one or more gripper gantries which are equipped with at least six grippers, can be lowered to the clamping cartridges and serve to remove the battery plate packs,
- at least two boxing-in frames, and
- one or more conveyor belts which serve to transport and to rotate the battery housings, which are made available, and are equipped with a rotary device are arranged at processing station 4.

2. The device for fitting and equipping motor vehicle battery housings as claimed in claim 1, wherein the lifting/rotary table is embodied as a rotary indexing table with an electrically moved lifting unit.

3. The device for fitting and equipping motor vehicle battery housings as claimed in claim 1, wherein at least four cartridge carriers are arranged, each offset through 90°, at the lifting/rotary table.

4. The device for fitting and equipping motor vehicle battery housings as claimed in claim 1, wherein a toothed rack drive which serves to rotate the clamping cartridges through 180° and is operated pneumatically or electrically is arranged at the pivoting mechanisms which are arranged at at least three processing stations.

5. The device for fitting and equipping motor vehicle battery housings as claimed in claim 1, wherein a multiple gripper which serves to fit the clamping cartridge with the tested packs of battery plates is arranged between the processing station 1 and a feed station, connected upstream, of battery plate packs whose thickness is tested.

6. The device for fitting and equipping motor vehicle battery housings as claimed in claim 1, wherein at least one buffer station is assigned to the processing station 1 in a feed station which is connected upstream.

7. The device for fitting and equipping motor vehicle battery housings as claimed in claim 1, wherein a separate drive for a roller and a fluxing agent basin which can each be moved horizontally under the clamping cartridge is arranged at the fluxing device.

8. The device for fitting and equipping motor vehicle battery housings as claimed in claim 7, wherein an electrically operated servo bevel wheel geared motor which is connected to a toothed rack and is coupled in terms of control to the lifting/rotary table is arranged as a separate drive.

9. The device for fitting and equipping motor vehicle battery housings as claimed in claim 1, wherein the drying device is embodied as a warm air dryer.

10. The device for fitting and equipping motor vehicle battery housings as claimed in claim 1, wherein the boxing-in frames of the processing station are arranged on a changing station which serves for cleaning during the processing operation.

11. The device for fitting and equipping motor vehicle battery housings as claimed in claim 1, wherein a transfer device which serves for simultaneously positioning at least two empty or filled battery housings at the boxing-in station is assigned to the processing station 4.

12. The device for fitting and equipping motor vehicle battery housings as claimed in claim 1, wherein a monitoring station which is equipped with a balance for determining and monitoring the battery weight and with a code reader which serves to assign a determined weight to the corresponding battery is assigned to the processing station 4.

* * * * *